United States Patent
Erdman, Jr.

(10) Patent No.: US 10,125,556 B1
(45) Date of Patent: Nov. 13, 2018

(54) PIPE FITTING ASSEMBLY APPARATUS

(71) Applicant: Abe B Erdman, Jr., Spivey, KS (US)

(72) Inventor: Abe B Erdman, Jr., Spivey, KS (US)

( * ) Notice: Subject to any disclaimer, the term of this patent is extended or adjusted under 35 U.S.C. 154(b) by 0 days.

(21) Appl. No.: 15/388,929

(22) Filed: Dec. 22, 2016

Related U.S. Application Data

(63) Continuation-in-part of application No. 14/316,450, filed on Jun. 26, 2014, now Pat. No. 9,528,331.

(60) Provisional application No. 61/841,981, filed on Jul. 2, 2013.

(51) Int. Cl.
| | |
|---|---|
| *B23P 19/04* | (2006.01) |
| *B23P 19/10* | (2006.01) |
| *E21B 19/00* | (2006.01) |
| *B25B 13/50* | (2006.01) |
| *B25B 28/00* | (2006.01) |
| *E21B 19/16* | (2006.01) |
| *B25B 1/20* | (2006.01) |

(52) U.S. Cl.
CPC .............. *E21B 19/161* (2013.01); *B25B 1/20* (2013.01); *B23P 19/04* (2013.01); *B25B 28/00* (2013.01)

(58) Field of Classification Search
CPC .... B27C 7/02; B27C 7/04; B27C 7/00; B25B 1/00; B25B 1/20; B25B 13/5008; B25B 13/5016; B25B 13/5041; B25B 13/5058; E21B 19/161; E21B 19/164; E21B 19/167
USPC .. 29/243.55, 243.526, 792, 266, 240, 281.1, 29/523; 269/43, 45, 156, 246, 41, 320; 81/52
See application file for complete search history.

(56) References Cited

U.S. PATENT DOCUMENTS

| | | | | |
|---|---|---|---|---|
| 443,312 A | * | 12/1890 | Bode | B25B 13/48 269/251 |
| 1,200,612 A | * | 10/1916 | Helm | E21B 19/164 81/57.18 |
| 1,216,600 A | | 2/1917 | Paschall | |
| 1,401,405 A | * | 12/1921 | Hole | E21B 19/16 173/164 |
| 1,498,032 A | * | 6/1924 | Hamer | E21B 19/161 81/52 |
| 1,997,102 A | * | 4/1935 | Chorlton | B21D 51/32 413/27 |
| 2,540,553 A | * | 2/1951 | Shobe | B25B 5/147 254/106 |
| 2,546,224 A | | 3/1951 | Johansen | |
| 2,680,395 A | | 6/1954 | Christiansen | |
| 2,871,743 A | | 2/1959 | Kelley | |
| 3,026,128 A | * | 3/1962 | Willis | F16L 23/04 279/114 |
| 3,500,708 A | | 3/1970 | Wilson | |

(Continued)

*Primary Examiner* — Joseph J Hail
*Assistant Examiner* — Jon Taylor

(57) ABSTRACT

An apparatus for assembling pipe fittings includes a base, an adjustable vice assembly and a pipe wrench turning unit. The adjustable vice assembly is mounted to the base and is operable for securely holding a first pipe fitting. A second pipe fitting is loosely threaded on to the first threaded pipe fitting. A pipe wrench engages the second pipe fitting. A motorized pipe wrench turning unit includes a drive shaft which rotates an offset member which, in turn, engages and turns the pipe wrench handle in order to screw the second pipe fitting on to the first pipe fitting. The apparatus for assembling pipe fittings may also be operated in a reverse fashion to disassemble pipe fitting sub-assemblies.

4 Claims, 12 Drawing Sheets

(56) References Cited

U.S. PATENT DOCUMENTS

| | | | | |
|---|---|---|---|---|
| 3,793,913 | A | * | 2/1974 | Wilms ................. E21B 19/164 81/57.18 |
| 3,832,918 | A | | 9/1974 | Lang et al. |
| 4,015,661 | A | * | 4/1977 | Christensen .......... E21B 19/164 166/77.53 |
| 4,064,774 | A | * | 12/1977 | Maddock ................. B23B 3/06 82/104 |
| 4,346,629 | A | * | 8/1982 | Kinzbach ............. E21B 19/164 81/57.15 |
| 4,501,335 | A | | 2/1985 | Gann |
| 4,545,569 | A | | 10/1985 | Schroder |
| 4,779,856 | A | | 10/1988 | Beeler |
| 4,844,171 | A | | 7/1989 | Russell |
| 4,986,152 | A | | 1/1991 | Sammons |
| 5,062,326 | A | | 11/1991 | Goldschmidt |
| 5,964,016 | A | * | 10/1999 | Ito ............................ B23C 3/18 279/14 |
| 7,246,546 | B1 | | 7/2007 | Knoblock et al. |
| 8,141,459 | B2 | | 3/2012 | Myburgh |
| 2005/0011312 | A1 | * | 1/2005 | Mardian ............... E21B 19/164 81/57.18 |
| 2010/0102763 | A1 | | 4/2010 | Kagoshima |
| 2011/0288711 | A1 | | 11/2011 | Yagagisawa |
| 2014/0360736 | A1 | * | 12/2014 | Angelle ................. E21B 19/10 166/382 |

\* cited by examiner

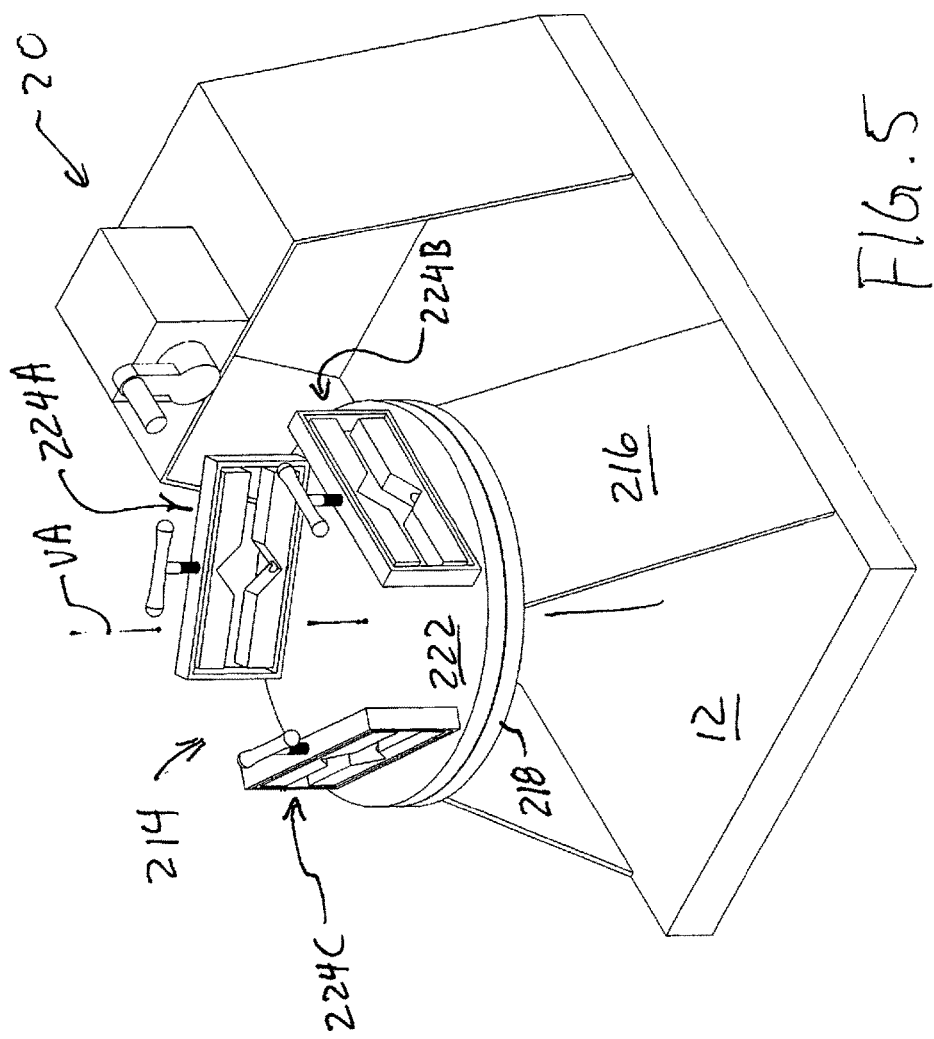

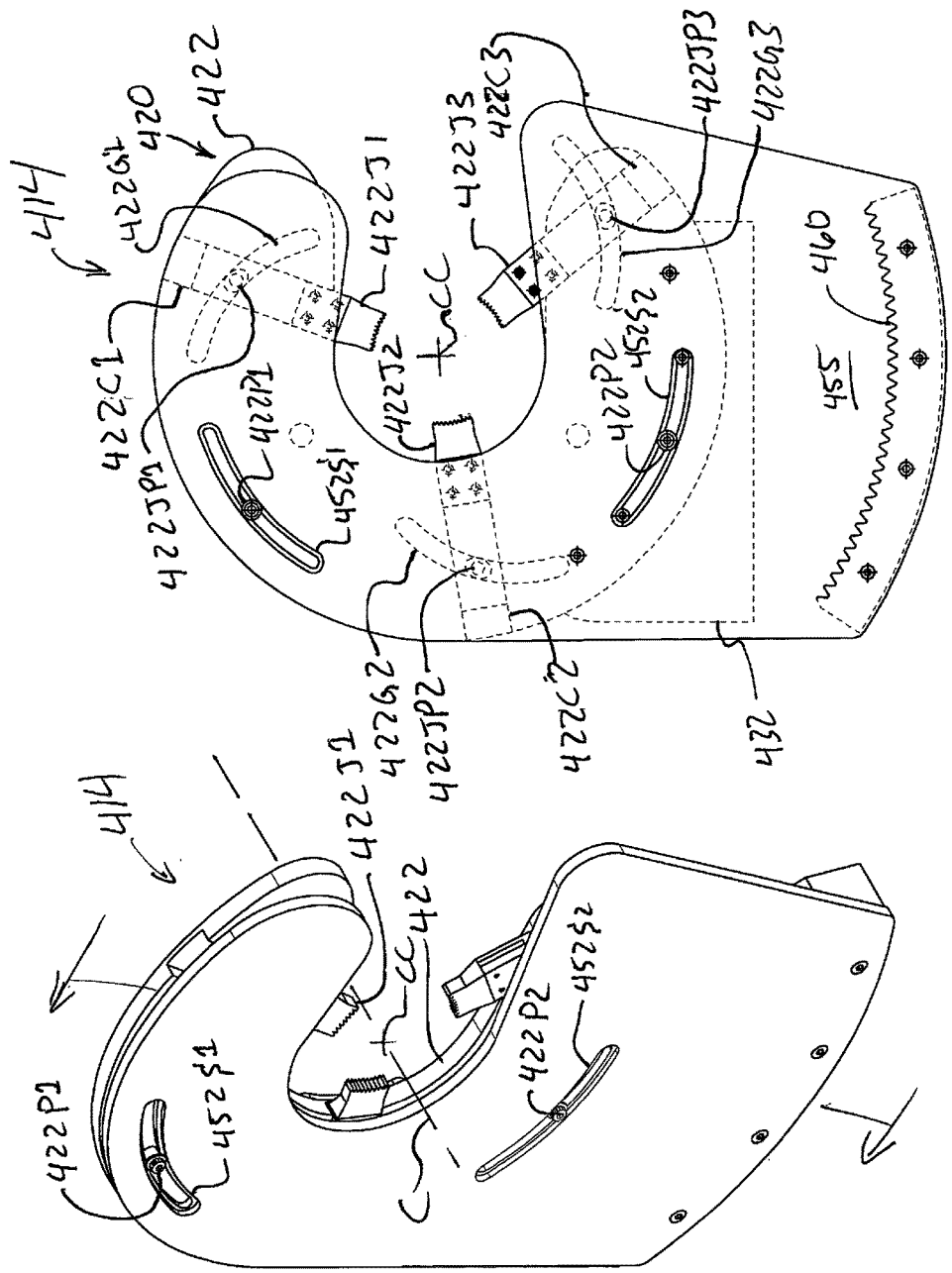

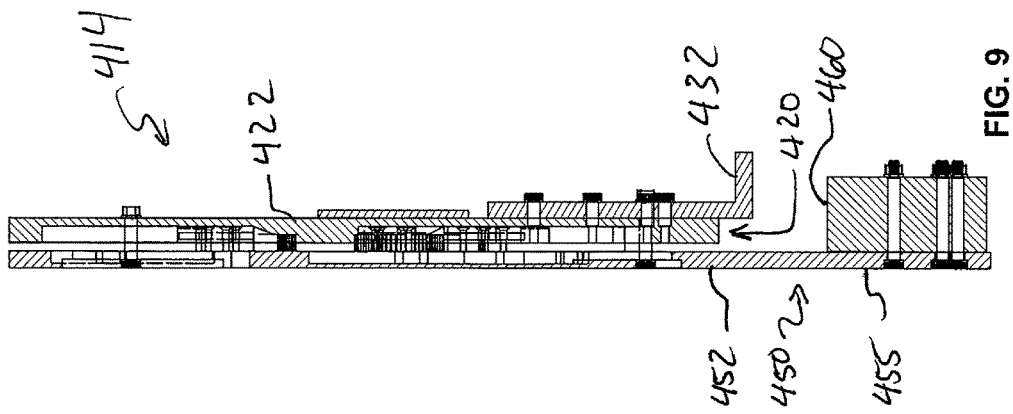
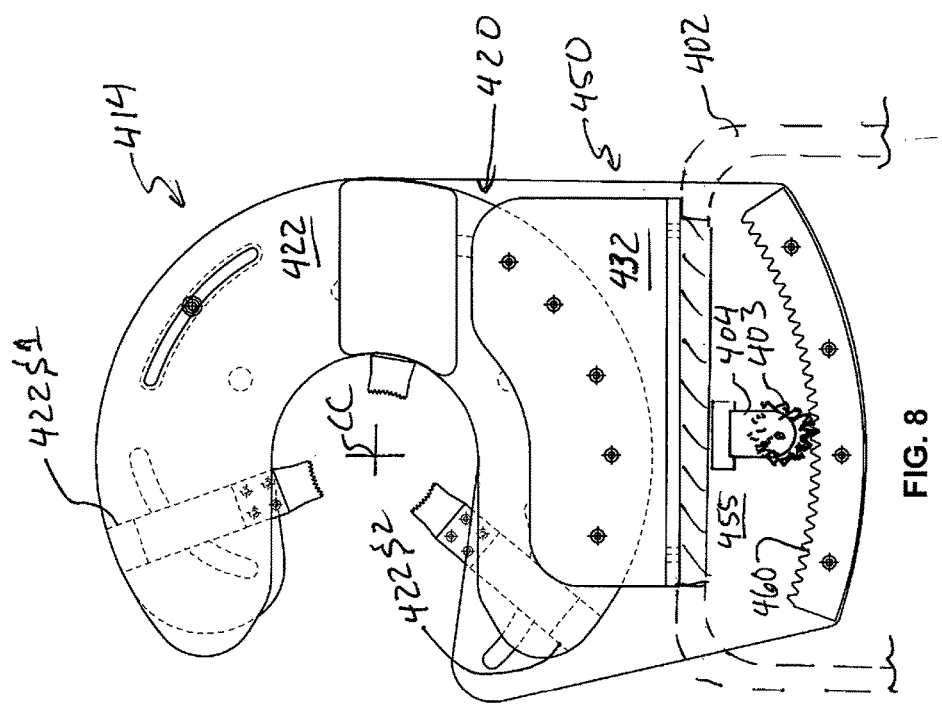

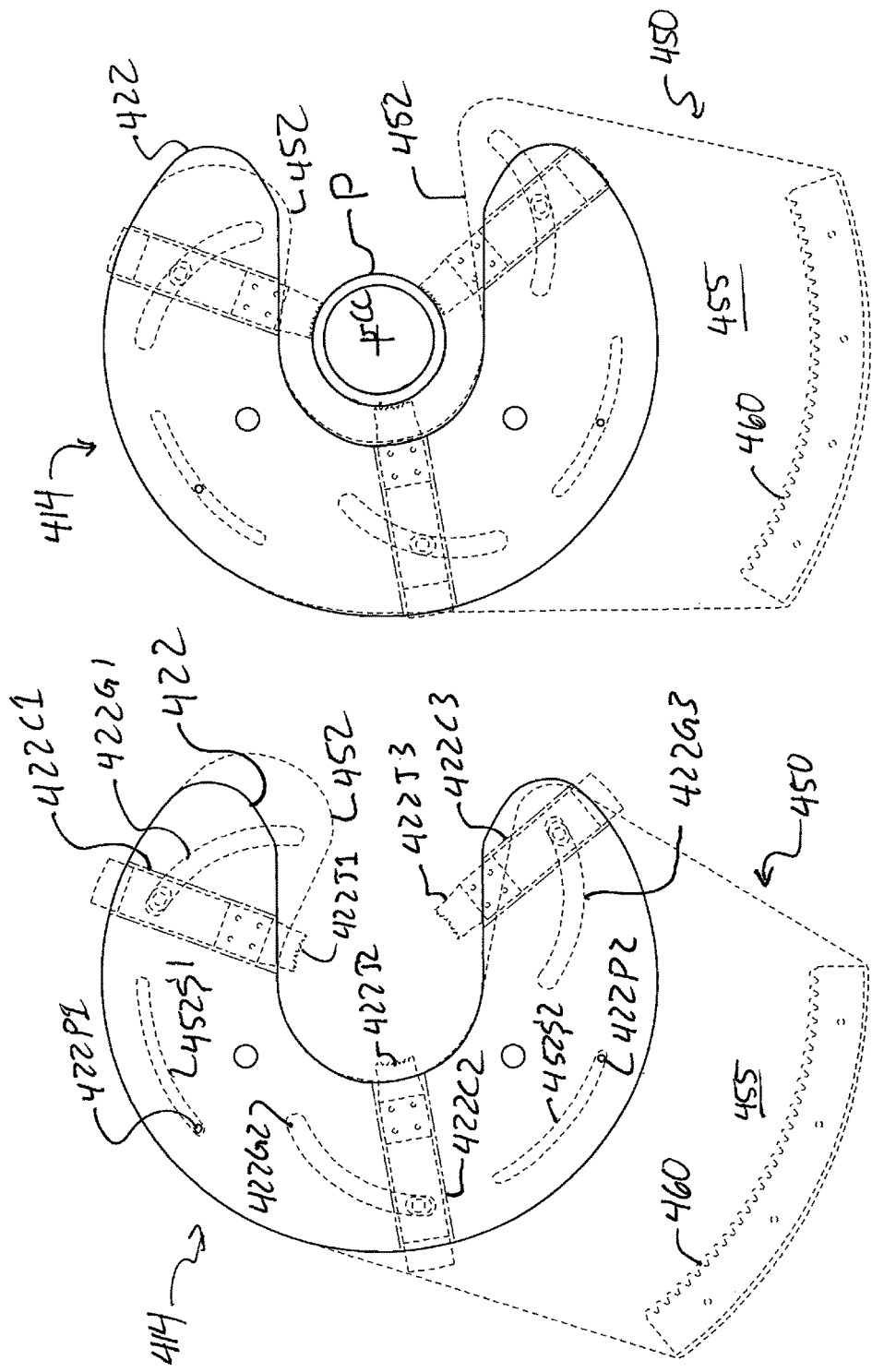

PIPE FITTING ASSEMBLY APPARATUS

CROSS REFERENCES TO RELATED APPLICATIONS

This application is a continuation-in-part of U.S. Non-Provisional patent application Ser. No. 14/316,450 filed on Jun. 26, 2014, which is incorporated herein by reference.

U.S. Non-Provisional patent application Ser. No. 14/316,450 claimed the benefit of U.S. Provisional Patent Application No. 61/841,981 filed on Jul. 2, 2013 which is incorporated herein by reference.

FIELD OF THE INVENTION

This invention relates to an apparatus for assembling threaded pipe fittings.

BACKGROUND

The construction of oil field tank facilities often requires screwing together and unscrewing relatively large diameter threaded pipe fittings and pipe connections. This work is typically performed by hand and often requires excessive amounts of torque applied by hand pipe wrenches in order to screw together sub-assemblies including pipe fittings and pipe fitting connections. Often, oil field workers must extend pipe wrench handles with "cheater bars" and perform dangerous pipe wrenching operations in order to securely join large diameter pipe fittings in order to complete threaded pipe fitting assemblies. Further, it is also occasionally necessary to disassemble pipe fittings and pipe connections. These operations can require even more torque than assembly operations. What is needed is a powered apparatus which is operable for screwing together pipe fittings and pipe connections and which is also operable for unscrewing pipe fittings and pipe connections.

SUMMARY

The above stated need is met by a pipe fitting assembly apparatus for screwing together pipe fittings and pipe fitting connections. The pipe fitting assembly apparatus includes a base, an adjustable vice assembly and a pipe wrench turning portion. The vice assembly is mounted to the base and is operable for securely holding a pipe fitting assembly and, preferably, the position of the vice assembly is also adjustable. The pipe fitting sub-assembly typically includes a first threaded pipe fitting or pipe fitting and a second corresponding threaded pipe fitting. The skilled reader should understand that by "pipe fitting" the applicant may be referring to a section of pipe which usually presents male threads at one end or may present a set of female threads. The "first pipe fitting" is held by the adjustable clamp structure. In most cases, the "second pipe fitting" is meant to refer to what is known by the skilled reader as a "fitting" or a "connection". Further, by "pipe fitting", especially in the case of the "second pipe fitting" the applicant means a fitting or connection selected from a group including but not limited to: 45° fittings, 90° fittings, T fittings, valves, check valves, unions and nipples. These are merely given as examples of the types of fittings and connections that the present pipe fitting assembly apparatus can assemble. So, the present apparatus is used to screw a second pipe fitting on to a first pipe fitting. The first pipe fitting is securely held by the vice assembly and the second fitting is loosely screwed on to the first pipe fitting. The first and second pipe fittings are aligned along an axis of rotation. A pipe wrench engages the second pipe fitting so that the handle of the pipe wrench extends normally with respect to the axis of rotation. The pipe wrench turning portion includes a drive unit mounted at least indirectly to the base. The drive unit powers a drive shaft which rotates about an axis which is preferably aligned with the axis of rotation of the pipe fittings. An arm assembly is fixed to the shaft. The arm presents an offset member which is generally parallel to and spaced away from the drive shaft. The offset member is positioned to urge the pipe wrench handle when the drive unit rotates the shaft. This action causes the second pipe fitting to be screwed onto the first pipe fitting. After the pipe fittings are screwed tightly together, the completed pipe fitting assembly can be removed from the vice assembly so that the vice assembly can receive and securely hold a next first pipe fitting. A reverse process can be conducted to unscrew and disassemble a pipe fitting sub-assembly. Accordingly, the drive unit is arranged to be operable in a reverse mode so that pipe fitting sub-assemblies may be disassembled.

In a second embodiment of the pipe fitting apparatus the vice assembly is a self-centering vice assembly which is arranged to receive and secure pipe workpieces so that the pipe workpiece is aligned with the axis of rotation of the pipe wrench turning portion. The self-centering vice assembly includes a stationary vice plate and a rotating vice plate. Both the stationary and rotating vice plates present openings which extend to a common center of rotation which are suitable for receiving pipe workpieces. The common center of rotation and the axis of rotation of the rotating vice plate are preferably common to and aligned with the axis of rotation of the pipe wrench turning portion. The stationary vice plate presents sliding jaws which are arranged to slide toward and away from the common center in a uniform manner when the rotating vice plate is rotated. After a pipe workpiece is received by the vice plates, the jaws may be slid toward the common center to secure the pipe workpiece so that it is at least sufficiently centered on the common center and aligned with the axis of rotation of the pipe wrench turning portion so that assembly and disassembly operations may be executed as described above.

BRIEF DESCRIPTION OF THE DRAWINGS

FIG. 5 is a perspective view of an optional turntable clamp structure.

FIG. 6 is a perspective view of a self-centering vice assembly suitable for use with a pipe fitting assembly apparatus.

FIG. 7 is a first plan view of the self-centering vice assembly.

FIG. 8 is a second plan view of the self-centering vice assembly.

FIG. 9 is a cross section view of the self-centering vice assembly taken from plane A-A indicated in FIG. 6.

FIG. 10 is a plan view showing the self-centering vice assembly in a first position wherein the jaw members are in an outboard position.

FIG. 11 is a plan view showing the self-centering vice assembly in an intermediate position wherein the jaw members are between an outboard position and an inboard position.

DETAILED DESCRIPTION

Figure 1:
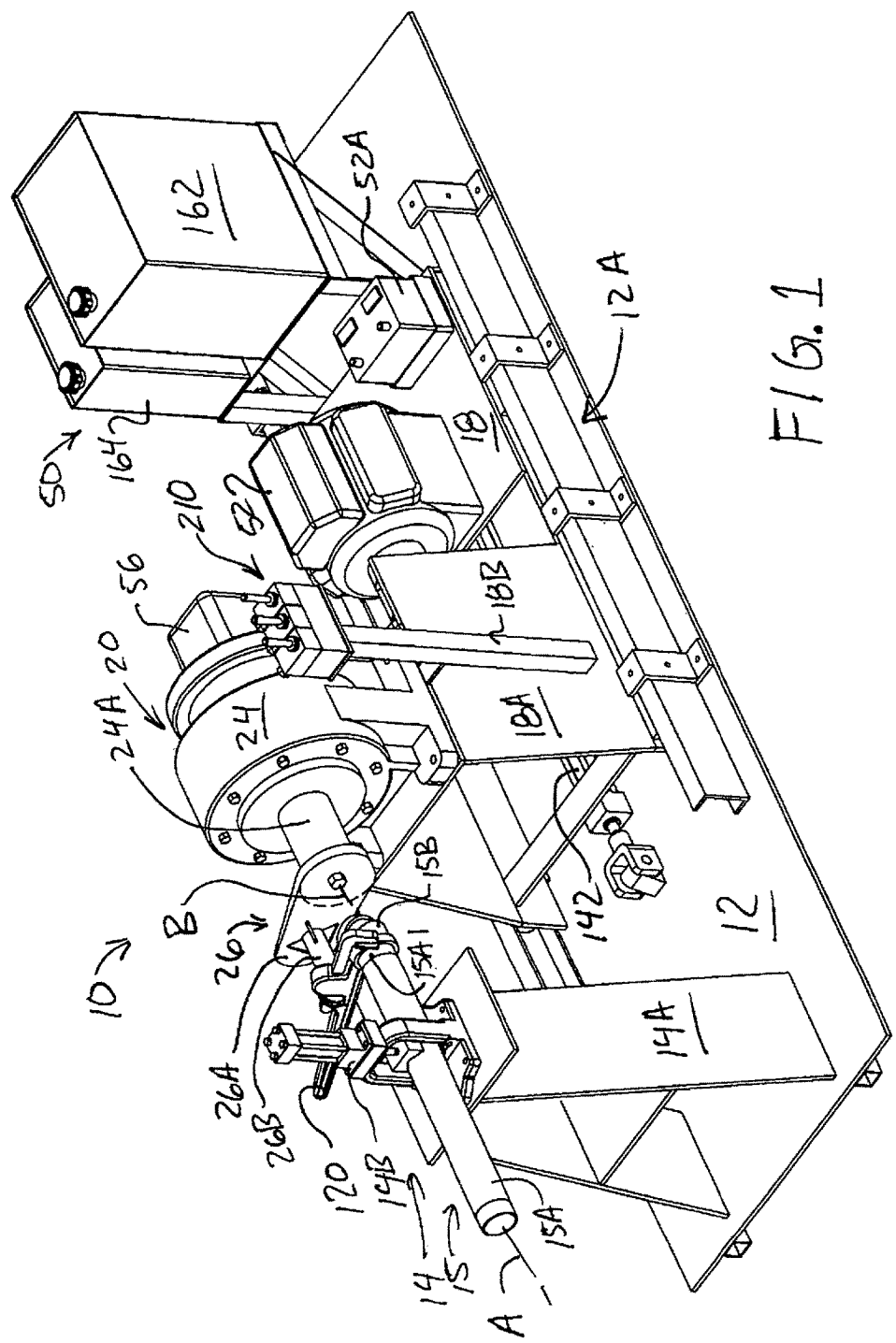
FIG. 1 is a first perspective view of the pipe fitting assembly apparatus.
Figure 2:
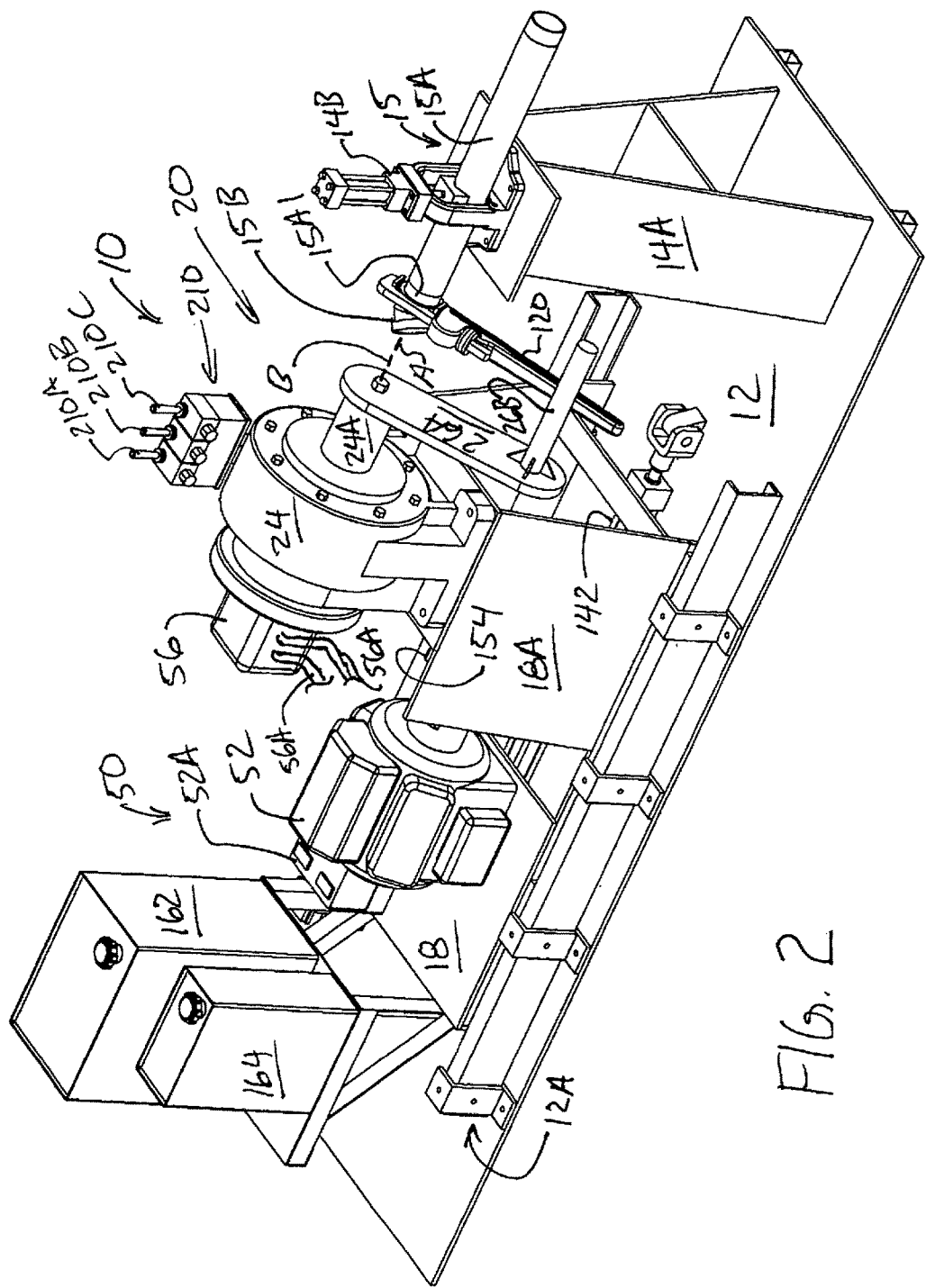
FIG. 2 is a second perspective view of the pipe fitting assembly apparatus.

Referring to the drawings, FIGS. 1 and 2 illustrate a pipe fitting assembly apparatus 10. As can be seen in FIGS. 1 and 2, pipe fitting assembly apparatus 10 includes a base 12, a vice assembly 14, a pipe wrench 120, a pipe wrench turning portion 20 and a drive unit 50.

Figure 4:
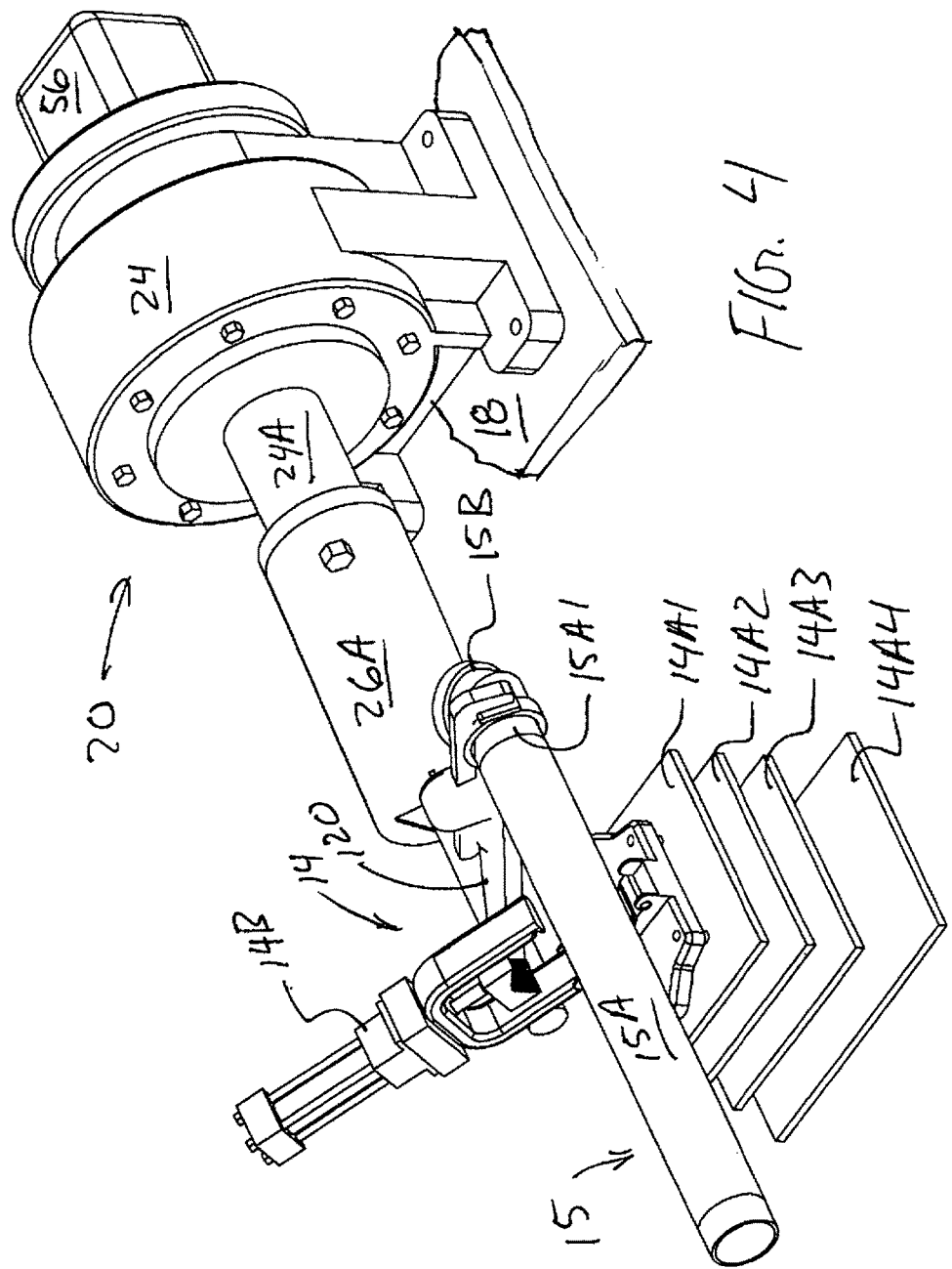
FIG. 4 is a close up perspective view of the vice assembly and the pipe wrench turning portion of the pipe fitting assembly apparatus shown including a plurality of shim plates.

Vice assembly 14 is mounted to base 12 and includes a stand 14A and a vice 14B which is adapted for securely holding a pipe fitting assembly 15. Vice 14B may be hydraulically actuated and controllable by means of hydraulic controls which will be described in greater detail below. Also, preferably, the position of vice assembly 14 is adjustable by means of using shim plates as shown in FIG. 4 or by other means as might be used by those who are skilled in the art. In this example, pipe fitting subassembly 15 includes a first pipe fitting 15A which is secured to vice 14B. First pipe fitting 15A is preferably aligned on an axis of rotation A which is the axis of rotation for pipe wrench turning portion 20. In this example, first pipe fitting 15A presents a set of male threads at its distal end which is oriented toward the opposite end of apparatus 10. In this example, second pipe fitting 15B presents a corresponding set of female threads. Initially, second pipe fitting 15B is loosely screwed onto the end of first pipe fitting 15A. As can be seen in FIGS. 1 and 2, a pipe wrench 120 is fitted to second pipe fitting 15B so that pipe wrench handle 120H extends generally normally from axis A. More generally, pipe wrench 120 is a leverage member which presents an elongated member which extends normally with respect to axis A indicated in FIG. 1. This leverage member may be a pipe wrench but also may be any member which is able to be secured the second pipe fitting and which also includes a member that extends normally with respect to axis A. Pipe wrench 120 is mounted to second pipe fitting 15B so that it securely clamps second pipe fitting 15B as second pipe fitting 15B is screwed onto first pipe fitting 15A. The purpose of pipe fitting assembly apparatus 10 is to tightly and securely screw second pipe fitting 15B to first pipe fitting 15A thereby completing a pipe fitting subassembly.

The skilled reader should understand that by "first pipe fitting 15A" the applicant is referring to pipe fitting or pipe connection or even a section of pipe which usually presents male threads at a working end 15A1 which is oriented toward pipe wrench turning portion 20. Working end 15A1 of first pipe fitting 15A may also present female threads. In most cases, the "second pipe fitting 15B" refers to what is known by the skilled reader as a "fitting" or a "connection". Accordingly, by pipe fitting 15B, in this example, the applicant means a fitting or connection selected from a group including but not limited to: 45° fittings, 90° fittings, T fittings, valves, check valves, unions and nipples. These are merely given as examples of the types of fittings and connections pipe fitting assembly apparatus 10 can assemble. The skilled reader should not view the pipe fittings shown in the figures as, in any way, illustrating any particular limitation on the types of pipe fittings and pipe connections that can be assembled by pipe fitting assembly apparatus 10. Pipe fitting assembly apparatus 10 is operable for assembling a vast variety of pipe fittings and pipe connections which are so numerous and varied that it is not practicable to illustrate and describe all of them or even a significant portion of them.

Figure 3:
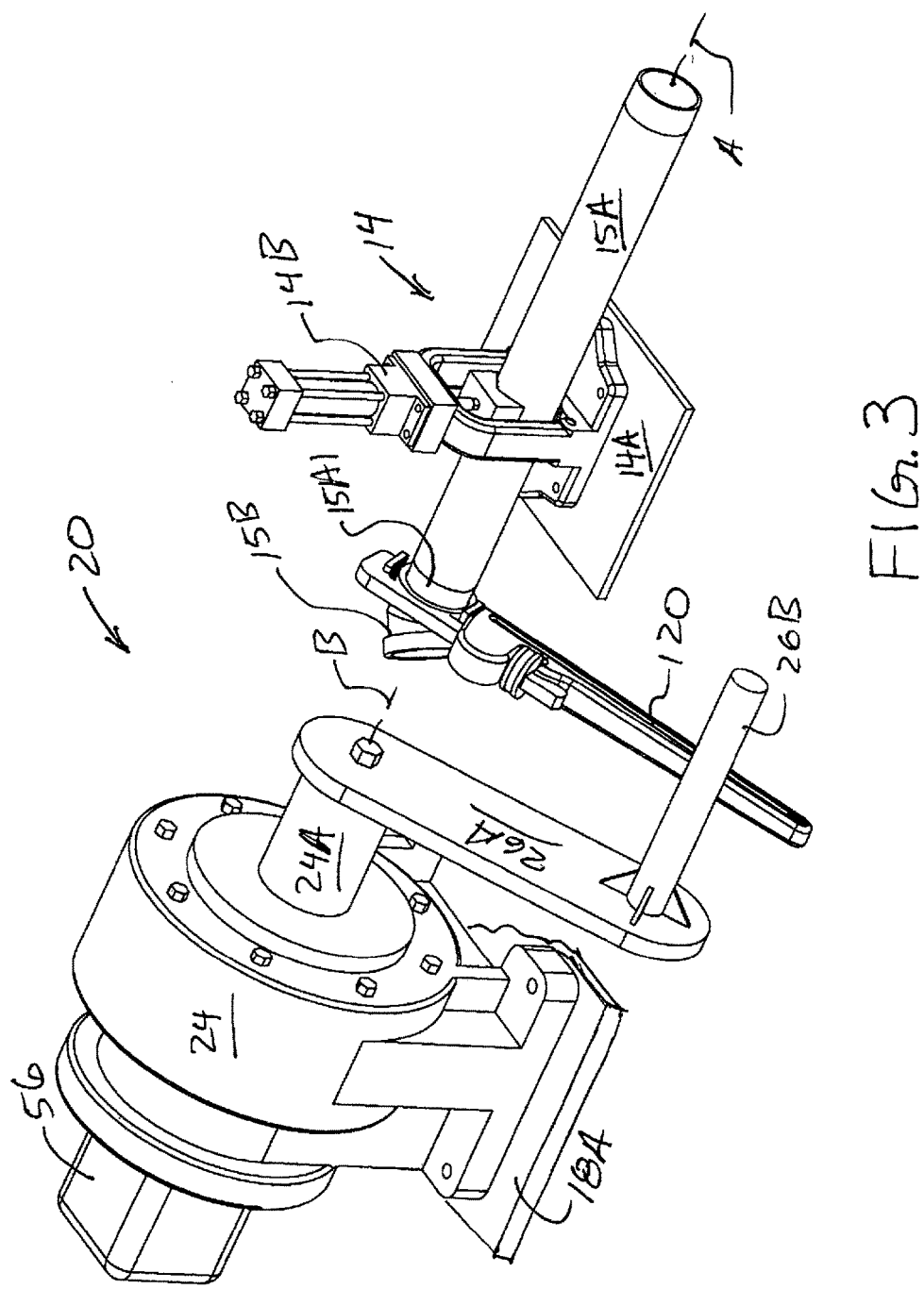
FIG. 3 is a close up perspective view of the vice assembly and the pipe wrench turning portion of the pipe fitting assembly apparatus.

As is shown in FIGS. 1 and 2 and in more detail in FIG. 3, pipe wrench turning portion 20 includes a hydraulic motor 56, a gear reducer 24 and an arm assembly 26. Pipe wrench turning portion may also be referred to as a leverage member turning portion if a leverage member that is not a pipe wrench, per se, is selected for engaging second pipe fitting 15B. Gear reducer 24 drives a shaft 24A at a moderate speed of approximately 5 to 25 rpm but could be configured to operate well outside that range. Gear reducer 24 is arranged so that shaft 24A turns about an axis of rotation B which is preferably co-axial with an axis of rotation A of pipe fitting assembly 15. Accordingly, it is preferable that one or both of vice assembly 14 and pipe wrench turning portion 20 are adjustable in the transverse and vertical directions in order to accomplish co-axial alignment of the axis A of rotation of pipe fitting assembly 15 and axis B of rotation of shaft 24A. FIG. 4 illustrates how an operator may select one or all of a series of shims 14A-14D to accomplish axial alignment of axes A and B.

Arm assembly 26 includes a radial member 26A which extends normally from shaft 24A and a longitudinal offset member 26B which extends normally from the distal end of radial member 26A and is generally parallel to and spaced away from axis B. Offset member 26B is configured to engage the handle of pipe wrench 120. As shaft 24A rotates, offset member 26 pushes upon the handle of pipe wrench 120 and thereby turns second pipe fitting 15B in relation to first pipe fitting 15A. In order to accomplish this, shaft 24A must be powered by a prime mover such that shaft 24A applies an amount of torque that, in this example, can be significantly larger than the torque that can be applied by a typical worker pushing on the handle of pipe wrench 120. In this example, the amount of torque that can be applied by apparatus 10 on the handle of pipe wrench 120 is sufficient to screw the fittings together to complete a strong joint.

In order to deliver sufficient torque to tighten pipe fitting sub-assembly 15, drive unit 50 is needed to turn gear reducer 24. The configuration of drive unit 50 and gear reducer 24 may be selected from a wide range of possible configurations. In this example, the applicant selected a configuration which includes an IC engine 52 coupled to a hydraulic pump 54 which supplies high pressure hydraulic fluid to a hydraulic motor 56. In this example, IC engine 52 could be a typical 25 hp IC engine. In this example, IC engine 52 is coupled to a hydraulic pump 54. Hydraulic pump 54, in turn, circulates pressurized and controllable hydraulic fluid to hydraulic motor 56 via supply line 56A and return line 56B. And, finally, hydraulic motor 56 is coupled to gear reducer 24 which drives shaft 24A at a reduced speed. The above described arrangement for powering wrench turning portion 20 is merely an example of how wrench turning portion 20 may be powered. The skilled reader will readily appreciate that any one of a number of prime movers and gearing arrangements may be selected to power wrench turning portion 20. Any drive arrangement will be acceptable if it provides sufficient torque at relatively slow speeds as described above.

Pipe wrench turning portion 20 and drive unit 50 are fixed to a frame 18 which, in this example, is mounted for longitudinal translation in relation to base 12 by a pair of spaced, parallel rails 12A. In this example, frame 18 further includes gear reducer stand 18A which supports gear reducer 24 and hydraulic motor 56 in an elevated position as shown in FIGS. 1 and 2. A hydraulic cylinder 142 connects between base 12 and frame 18 for translating pipe wrench turning portion 20 and drive unit 50 between a retracted non-operating position in which offset member 26B does not contact the handle of pipe wrench 120 and an extended operating position in which offset member 26 does engage the handle of pipe wrench 120. The translation of frame 18 (and the components it carries) is actuated by a two-way hydraulic cylinder 142 which connects between base 12 and frame 18. Hydraulic cylinder 142 is also supplied with pressurized hydraulic fluid by hydraulic pump 54. A hydraulic fluid reservoir 162 and is mounted to frame 18 for retaining a supply of hydraulic fluid for hydraulic motor 56. A fuel tank 164 is also mounted to frame 18 for supplying fuel to IC engine. Still further a battery 52A is also mounted to frame 18 for supplying electrical power for the starter motor (not shown) for starting IC engine 52. As shown in FIG. 1, a control set 210 is supported by a control set stand 18B which is, in turn, fixed to gear reducer stand 18A. Control set 210 presents a series of control handles 210A, 210B and 210C which are used by an operator to control the flow of hydraulic fluid between hydraulic pump 54, hydraulic motor 56 and reservoir 162 as well as between hydraulic pump 54 and hydraulic cylinder 142. Accordingly, an operator may control the location of pipe wrench turning portion 20 and drive unit 50 as noted above and an operator may control the speed and direction of rotation of shaft 24A between neutral and maximum speed settings. As noted above, in this example, drive unit 50 is arranged to drive shaft 24A between 0 rpm when in neutral and approximately 5 to 25 rpm when operating.

As the skilled reader can understand from the above detailed description, the pipe fitting assembly apparatus 10 can be used to join threaded pipe fitting sections having relatively large diameters. As those who are familiar with such threaded pipe fitting sections, once a threaded pipe fitting section is significantly larger than two inches, the torque required to properly assembly a properly sealed pipe fitting joint increases geometrically with diameter. The amount of required torque, even with modest diameter of 3 and 4 inches, increases to levels that are beyond what can be safely applied by a worker using even a large pipe wrench. Because of this, significant time is spent trying to assemble such sub-assemblies in the field. And, injuries can result when workers try to arrange make shift apparatuses for augmenting the torque that can be applied with a pipe wrench. By using the pipe fitting assembly apparatus described above, workers can set up a work station wherein pipe fittings may be joined rapidly and safely, thereby reducing the time, costs and risks associated with assembling connections and pipe fittings at oil fields and at any other facility where pipe fittings and pipe connections need to be screwed together.

The skilled reader will also appreciate how hydraulic motor 56 may be controlled to operate in a reverse direction. By selecting a reverse direction for hydraulic motor 56 and arranging pipe wrench 120 in an opposite direction from that shown in the figures, it is possible for an operator to disassemble a pipe fitting sub-assembly. Oil field operations often present situations wherein oil filed tank connections are being replaced or modified and in which it is necessary to disassemble existing fitting sub-assembly. The ability to operate in reverse is an important capability for pipe fitting assembly apparatus 10.

FIG. 4 shows the use of shim plates 14A1, 14A2, 14A3 and 14A4 which are selectively stacked to establish alignment between axis A and axis B. Any one of a number of adjustment means may be selected for establishing proper alignment between axis A and axis B. Although aligning axes A and B is preferable for the operation of pipe fitting assembly apparatus 10, perfect alignment is not absolutely necessary.

FIG. 5 illustrates an optional turn-table vice assembly 214. Turntable vice assembly 214 may be used in lieu of vice assembly 14 shown in FIGS. 1-3. Turntable vice assembly 214, in this example, includes a stand 216, a turntable platform 218, a turntable 222 and vice assemblies 224A, 224B and 224C. Stand 216 is preferably fixed to pipe fitting assembly apparatus base 12 shown in FIGS. 1 and 2 generally in same position as stand 14A shown in FIGS. 1 and 2. Turntable platform 218, in this example, is a disc shaped generally horizontal member which is fixed to stand 216. Turntable 222 is rotatably mounted to plat form 218 but is also capable of being locked in one of at least three selected positions suitable for aligning one of the vice assemblies with a wrench turning portion 20. The rotation of turntable 222 is arranged for rotation about a vertical axis VA indicated in FIG. 5. In this example, three vice assemblies 224A, 224B and 224C are evenly spaced around and fixed to platform 218.

Turntable vice assembly 214 makes it possible for an operator to mount a pipe fitting sub-assembly such as pipe fitting sub-assembly 15 shown in FIG. 1, to a vice assembly while a previously mounted pipe fitting sub-assembly is being acted on by wrench turning portion 20. The addition of the turntable vice assembly 214 makes it possible to increase the rate at which pipe fitting sub-assemblies may be assembled, because sub-assemblies may be mounted to the machine while another sub assembly is being assembled.

FIGS. 6-12 illustrate a self-centering vice assembly 414 which is suitable for use with a pipe fitting assembly apparatus. FIGS. 1-3 shows a pipe fitting assembly apparatus 10 which includes a conventional vice 14B. As noted above, it is important that the securing of a workpiece as shown in FIG. 3 occur such that the axis A of the workpiece (a pipe in this case) is at least generally aligned with the axis of rotation B of pipe wrench turning portion 20. Although it may not be necessary to have perfect alignment of axes A and B, it is preferable to have alignment at least within a few degrees or a few millimeters. Thus, the use of shims 14A1-14A4 is shown in FIG. 4 and described above as a way to accomplish alignment of axes A and B.

Self-centering vice assembly 414 shown in FIGS. 6-8 addresses the need to align the axis of the workpiece, A and the axis of rotation B of pipe wrench turning portion 20. Self-centering vice assembly 414 includes a first vice plate assembly 420 and a second vice plate assembly 450. First vice plate assembly 420 is held in a stationary position (when self-centering vice assembly 414 is in use) by a bracket 432. Bracket 432 is, in turn, secured to a frame or support 402 which is stationary with respect to the frame of a pipe fitting assembly apparatus 10. Thus vice assembly 414 may be secured to a frame or support such as stand 14A shown in FIG. 1 in lieu of vice 14B, or could even be one of a plurality of vice assemblies 414 mounted to a turn table such as turn table 222 shown in FIG. 5 in lieu of vice assemblies 224A, 224B and 224C which are also shown in FIG. 5. Second vice plate assembly 450 is not stationary but is mounted to first vice plate assembly 420 so that it is able to rotate relative to first vice plate assembly 420 about a common center CC and a common axis C which are both indicated in FIG. 6. How, in this example, second vice plate assembly 450 maintains its position as it rotates and how it is rotated will be described in below.

It is important that self-centering vice assembly 414 be aligned with axis of rotation B of a pipe wrench turning portion such as pipe wrench turning portion 20. Thus, by referring to FIG. 6, the skilled reader can observe that axis C which passes through common center CC of self-centering vice assembly 414 is normal to the plates of vice assembly 414. It is preferable that axis C be aligned with axis of rotation B of a pipe wrench turning portion such as pipe wrench turning portion 20 shown in FIGS. 1-3 when self-centering vice assembly 414 is used with a pipe fitting assembly apparatus. Any workpiece pipe held by self-centering vice assembly 414 will have its axis aligned with axis of rotation B of a pipe wrench turning portion such as pipe wrench turning portion 20 shown in FIG. 3 with sufficient accuracy to facilitate the optimal operation of pipe fitting assembly apparatus 10.

Figure 12:
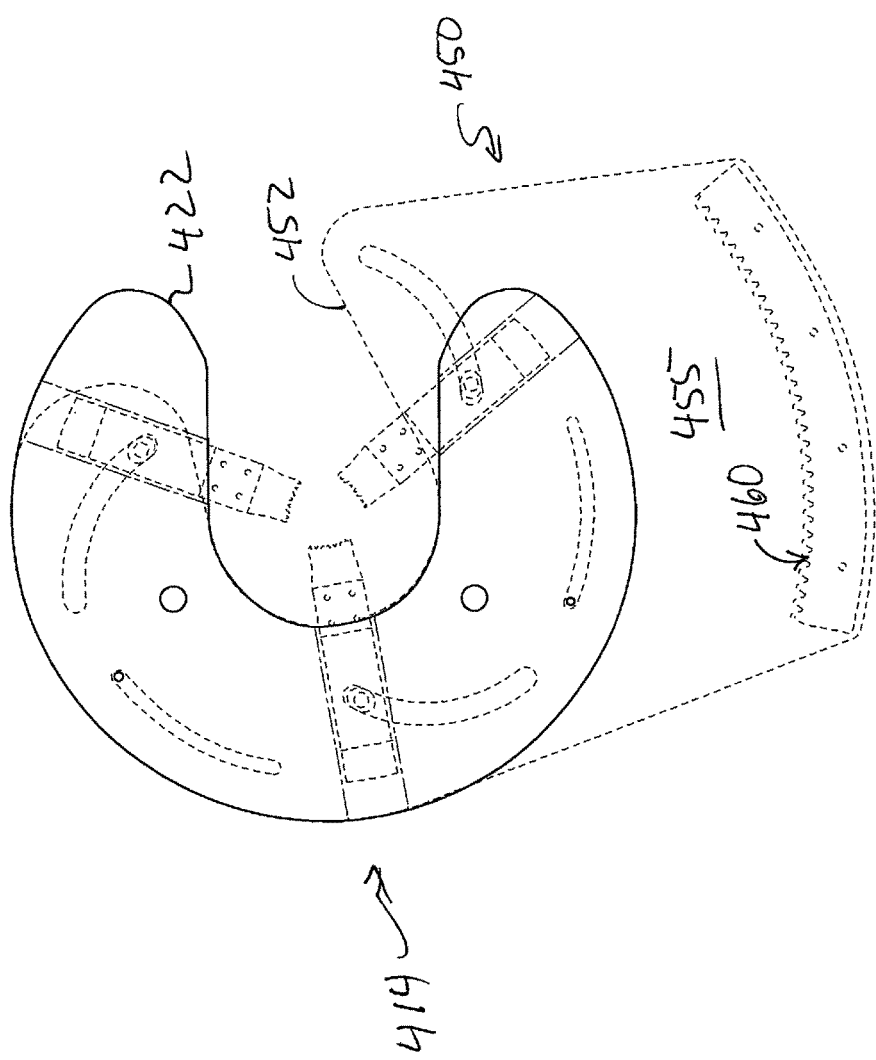
FIG. 12 is a plan view showing the self-centering vice assembly in a second position wherein the jaw members are in an inboard position.

As noted above, self-centering vice assembly 414 includes a first vice plate assembly 420 and a second vice plate assembly 450. First vice plate assembly 420, in turn, includes a first vice plate 422 which presents a central opening which extends from the periphery of vice plate 422 to its center. This opening is suitable for receiving a pipe workpiece. In this example, first vice plate 422 presents two spaced projecting guide pins 422P1 and 422P2 which project normally from the surface of vice plate 422 which is adjacent second vice plate assembly 450. The vice plate of second vice plate assembly 450 has corresponding arc shaped grooves which receive guide pins 422P1 and 422P2 so that guide pins 422P1 and 422P2 are able to guide the vice plate of second vice plate assembly 450 as it rotates. In this example, first vice plate 422 presents three radial channels 422S1, 422S2 and 422S3 which extend between the outside edge of first vice plate 422 to its inside edge. Each of radial channels 422C1, 422C2 and 422C3 slidably receives one of jaw members 422J1, 422J2 and 422J3 respectively. Each jaw member is able to slide within each radial channel between a first outboard position as shown in FIG. 10 and a second inboard position as shown in FIG. 12. As can be best seen in FIG. 7, each jaw member 422J1, 422J2 and 422J3 presents a normally projecting jaw pin 422JP1, 422JP2 and 422JP3 respectively which are indicated in FIG. 7. Each jaw pin 422JP1, 422JP2 and 422JP3 extends away from each jaw pin toward second vice plate assembly 450. As can be also be seen in FIG. 7, each jaw member 422J1, 422J2 and 422J3 presents an end portion which presents teeth for engaging the surface of a pipe workpiece.

Second vice plate assembly 450 includes a second vice plate 452 which also presents an opening which extends from its edge to common center CC of first vice plate assembly 420 and second vice plate assembly 450. As was the case with first vice plate 422, the opening of second vice plate 452 is suitable for receiving a pipe workpiece. As noted above, second vice plate 452 presents two arc shaped circumferential guide slots 452S1 and 452S2 which are located and arranged to receive guide pins 422P1 and 422P2 of first vice plate 422. In this example, guide slots 452S1 and 452S2 extend through second vice plate 452. Guide pins 422P1 and 422P2 slide within slots 452S1 and 452S2 to guide the rotation of second vice plate assembly 450 so that it rotates around center common CC between the positions shown in FIG. 10 and FIG. 12.

As can be seen in FIGS. 7 and 8, in this example, second vice plate assembly 450 includes an extended flange 455 to which is mounted an arc shaped gear rack 460. Gear rack 460 is arranged so that it describes an arc which is centered on the common center of first and second vice plate assemblies 420 and 450. As can be seen in FIG. 8, gear rack 460 is engaged by a gear 403 which is driven by motor 404. Motor 404 is mounted to stationary frame 402 which also supports first vice plate assembly 420. Motor 404 is arranged to be able to rotate gear 403 in both directions.

As can be best seen in FIGS. 10-12, in this example, second vice plate 452 presents three spiral grooves 422G1, 422G2 and 422G3 which are oriented to face first vice plate 422. As noted above each jaw member 422J1, 422J2 and 422J3 each presents an outwardly extending jaw pin (422JP1, 422JP2 and 422JP3 respectively). Spiral grooves 422G1, 422G2 and 422G3 are arranged to receive jaw pins 422JP1, 422JP2 and 422JP3 respectively. In this example, spiral grooves 422G1, 422G2 and 422G3 are also arranged such that when second vice plate 452 is rotated from the first position shown in FIG. 10 to the second position shown in FIG. 12, jaw members 422J1, 422J2 and 422J3 are simultaneously urged so that they slide within channels 422C1, 422C2 and 422C3 respectively from the first outboard position shown in FIG. 10 toward common center CC toward the second inboard position shown in FIG. 12. During actual use, it is contemplated that a workpiece pipe P may be present such that when second plate assembly 450 is at an intermediate position (an "intermediate position" being understood by the applicant as a position which is between the positions shown in FIGS. 10 and 12). One such intermediate position is shown in FIG. 11, wherein jaw members 422J1, 422J2 and 422J3 are shown engaging pipe P in order to secure pipe P for an operation. A reverse operation is accomplished to urge jaw member 422J1, 422J2 and 422J3 are urged away from common center CC and toward the outboard position shown in FIG. 10, by reversing the rotation of gear 403 shown in FIG. 8 and thereby reversing the rotation of second plate assembly 450.

For self-centering vice assembly 414 to function properly, it is important that jaw members 422J1, 422J2 and 422J3 be as identical to each other as practically possible and it is also important that spiral grooves 422G1, 422G2 and 422G3 be uniformly spaced, and in particular radially spaced in a manner that corresponds to the radial spacing of channels 422C1, 422C2 and 422C3 in vice plate 422 and that spiral grooves 422G1, 422G2 and 422G3 be as identical as practically possible in terms of their shapes, orientations and spacing with respect to each other and with respect to common center CC. If these criteria are met, jaw member 422J1, 422J2, 422J3 will be all spaced from common center CC at equal distances from common center CC at any position including the positions shown in FIGS. 10 and 12 and any position between the positions shown in FIGS. 10 and 12. When this is the case, then any workpiece pipe P, regardless of its diameter, which is secured by jaw members 422J1, 422J2, 422J3 will also be centered on common center CC. By "practically possible", the applicant means to indicate that these criteria are met with a degree of precision which is usually accomplished by a skilled machinist who is defining features in a part with a degree of precision such as is normally expected for such parts. In this case, it is necessary that the parts described be accurate enough to move smoothly without binding up and that a pipe workpiece P be centered on axis C and common center CC with sufficient accuracy to facilitate the smooth operation of a pipe fitting assembly apparatus.

Figure 13:
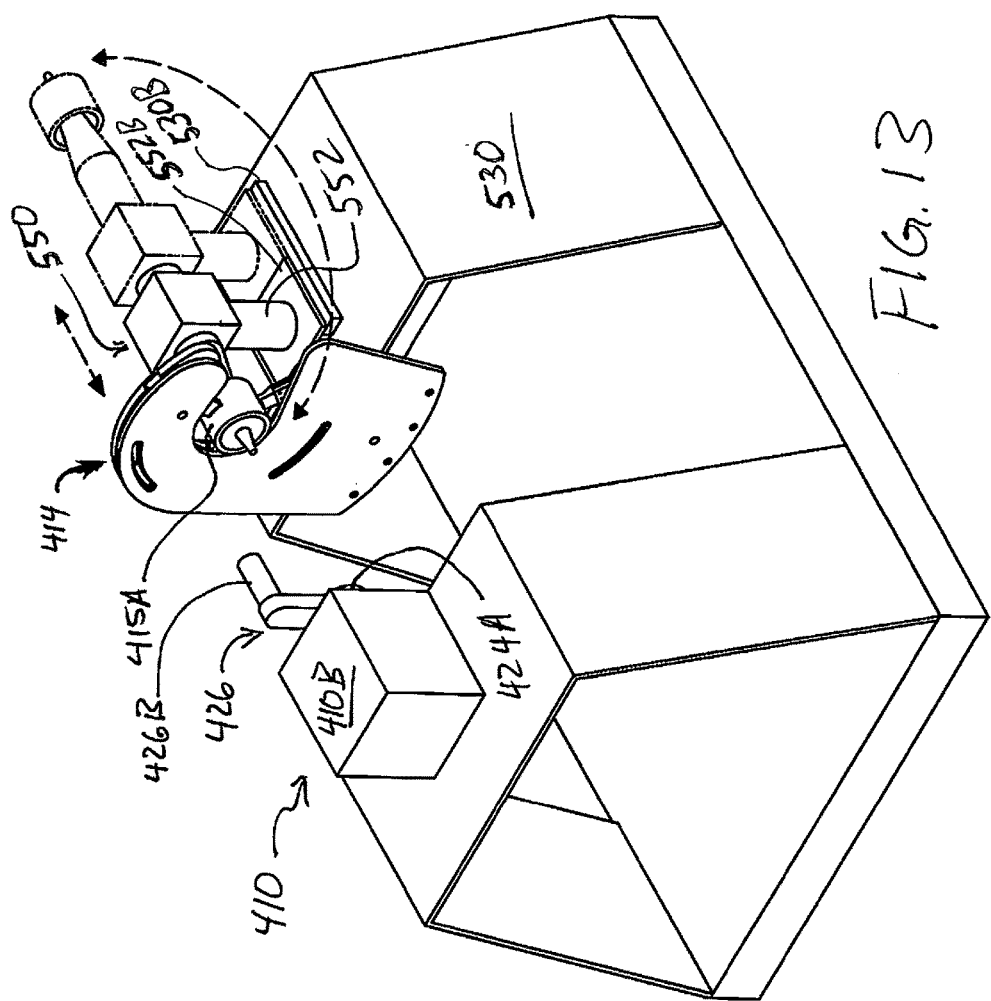
FIG. 13 is a perspective view showing a self-centering vice assembly integrated into a pipe fitting assembly apparatus 410.
Figure 14:
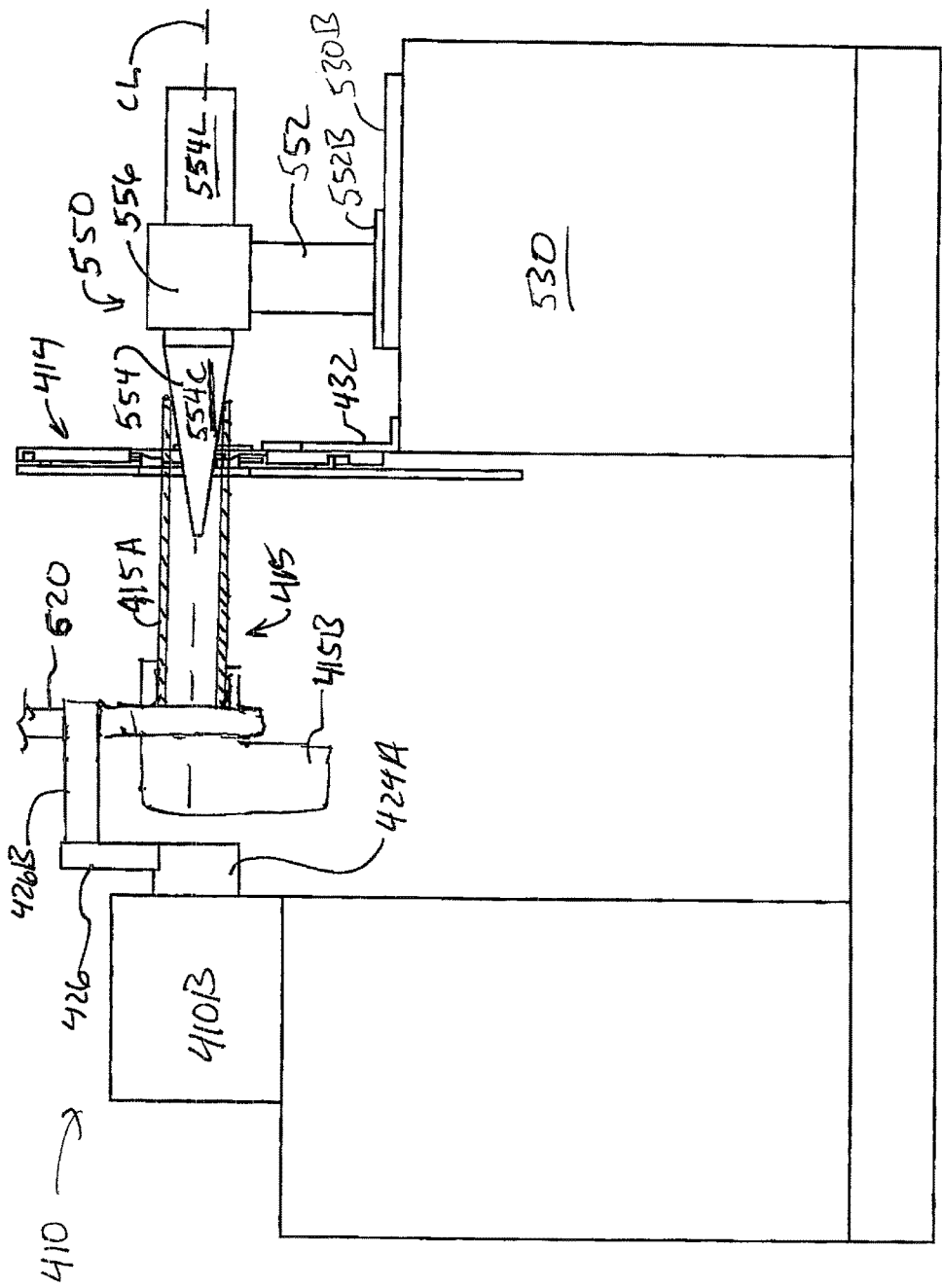
FIG. 14 is a side view showing a self-centering vice assembly integrated into a pipe fitting assembly apparatus 410.
Figure 15:
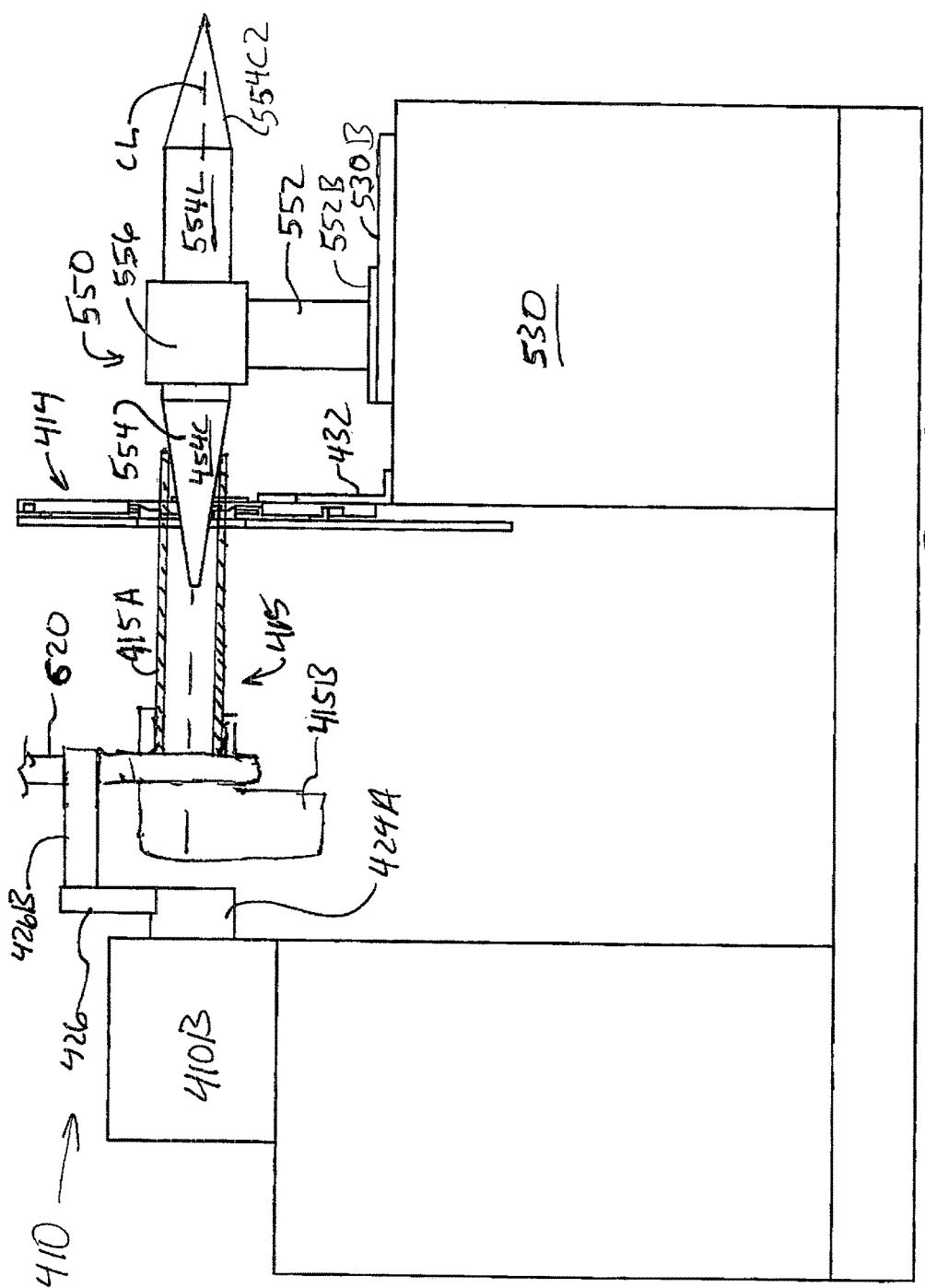
FIG. 15 is a side view showing a self-centering vice assembly integrated into a pipe fitting assembly apparatus 410 which has a second opposite cone portion added to the mandrel assembly.

FIGS. 13-15 illustrate how a self-centering vice assembly 414 may be integrated with a pipe fitting assembly apparatus 410. The skilled reader should understand that pipe fitting assembly apparatus 410 is only partially illustrated and greatly simplified for clarity in FIGS. 13 and 14. Thus, the drive portion of pipe fitting assembly apparatus 410 may be essentially similar or even identical to drive portions of pipe fitting assembly apparatus 10 shown in FIG. 1. "Drive portions" of pipe fitting assembly apparatus 10 may be understood as including pipe wrench turning portion 20 and a drive unit 50 and even could include a wrench such as wrench 120 as shown in FIG. 1. For ease of illustration much of pipe wrench turning portion 20 and a drive unit 50 illustrated in FIG. 1 is represented by a simple schematic power unit 410B which turns an offset member 426 which is analogous to offset member 26 of wrench turning portion 20 shown in FIG. 1. The skilled reader should understand that power unit 410B is capable of turning shaft 424A (as well as offset member 426 and longitudinal offset member 426B) at slow speeds with substantial torque as is the case with pipe wrench turning portion 20 of pipe fitting assembly apparatus 10. Still further pipe fitting 415A is greatly simplified and cut short in FIG. 13 in order to reveal other components. In actual practice, pipe fitting 415A could extend much farther toward longitudinal offset member 426B as shown in FIG. 14 and would be able to accommodate a pipe wrench or similar tool as shown in FIGS. 1 and 14. FIGS. 13 and 14 are primarily presented to show how a pipe fitting assembly 415 (shown in FIG. 14) is held by self-centering vice assembly 414.

As can be best seen in FIG. 14, self-centering vie assembly 414 is mounted by bracket 432 to a base structure 530. A mandrel assembly 550 is also mounted to base structure 530. Mandrel assembly 550 is located adjacent to self-centering vice assembly 414. In this example, mandrel assembly 550 includes a stand 552, a mandrel 554 and a mandrel support fitting 556. Stand 552 is mounted to base 530 by a stand plate 552B so that it is able to translate in the longitudinal direction. In this example base structure 530 presents a preferably fixed receiving plate 530B, which could have dove tail features, which, in this example, preferably would slidably or translatably receive stand plate 552B. In this example, support fitting 556 may be rotatably mounted to stand 552 to provide for the rotation of mandrel 554 as described below. Accordingly, stand plate 552B and stand 552 are arranged so that mandrel 554 is at least able to translate between a first position in which it is proximate to self-centering vice assembly 414 and a second position in which it is spaced away from self-centering vice assembly 414. As can be best seen in FIG. 14, mandrel 554 includes a cone portion 554C and a cylindrical portion 554L which are arranged on a centerline CL. Preferably, cylindrical portion 554L is able to slide within mandrel support fitting 556 and is also able to be selectively fixed with respect to mandrel support fitting 556. Centerline CL also passes through the center of self-centering vice assembly 414. Still further, mandrel support fitting 556 is preferably able to rotate with respect to stand 552 between a first position shown with solid lines in FIG. 13 wherein cone portion 554C is oriented toward self-centering vice assembly 414 and a second position shown with phantom lines in FIG. 13 wherein cone portion 554C is oriented away from self-centering vice assembly.

It is also possible to adapt stand plate 552B so that it is able to accommodate two or more mandrel assemblies 550 much as is shown in FIG. 13 (except the phantom lines for the second position in FIG. 13 would be shown as solid lines). With such a duel mandrel arrangement, it would be possible to load a second workpiece while a first workpiece was being assembled or disassembled thereby doubling the through-put rate. To do this, stand 552 and stand plate 552B must be able to translate longitudinally and also be able to be secured at least in a working position such as is shown in FIG. 13. The rotation of mandrel 554 could be accommodated, as noted above, by the rotation of support fitting 556 with respect to stand 552.

Another optional configuration for mandrel assembly 550, as shown in FIG. 15, would be to add a second cone portion 554C2 at the opposite end of cylindrical portion 554L (opposite from a first cone portion 554C shown in FIGS. 13 and 14) so that two cone portions 554C are facing in opposite directions. As noted above, cylindrical portion 554L would be able to slidably adjust and be selectively fixed with respect to mandrel support fitting 556. And, as noted above, it would be necessary for stand 552 and stand plate 552B to be able to translate longitudinally upon base plate 530B between first and second positions much as shown in FIG. 13 and well as being able to fix stand 552 in those positions. And as noted above, any needed rotation of mandrel 554 could be accomplished by rotating mandrel support fitting 554 with respect to stand 552. This approach allows for the use of a single mandrel assembly 550 which is able to load and position a second workpiece while a first pipe fitting assembly is being assembled or disassembled.

As is shown in FIG. 14, cone portion 554C is adapted so that when support stand 552 is translated toward self-centering vice 414, the outside surface of cone portion 554C comes into firm, supporting contact with the inside edge of pipe 415A. Pipe 415, being held by self-centering vice assembly 414A and engaged by cone portion 554C of mandrel assembly 550, is also centered on centerline CL. If self-centering vice assembly 414 firmly clamps around pipe 415A and if cone portion 554C firmly engages the inside rim of pipe 415A as shown in FIG. 14, then forces which are applied by a wrench 620 will not cause either end of pipe 415A to deviate from center line CL. Thus, self-centering vice assembly 414 is adapted to react out torque which is applied by wrench 620. Yet, self-centering vice assembly 414 and mandrel assembly 550 work together to react any bending forces which may be applied by wrench 620 to pipe fitting assembly 415 from pipe fitting assembly 415 into base 530.

Because mandrel assembly 550 is able to translate and rotate, it is relatively easy for an operator to translate mandrel assembly 550 away from self-centering vice assembly 414 and rotate cone portion 554C to the phantom position shown in FIG. 13 in order to release or receive a pipe fitting assembly in an orientation and location that is spaced away from the remainder of pipe fitting assembly apparatus 410. Once a workpiece has been received by cone portion 554C (or cone portion 554C2 shown in FIG. 15), it may be rotated into position between the jaws of self-centering vice assembly 414 much as shown in FIG. 13. A reverse sequence of steps may be used to remove a workpiece from pipe fitting assembly apparatus 410.

Thus from the above description, the skilled reader is able to see how pipe fitting assemblies may be assembled or even disassembled by using a pipe fitting assembly apparatus 410. Because of the above described features, it is possible for an operator to quickly load and unload pipe fitting assemblies. Accordingly it is possible to quickly and efficiently assemble or disassemble pipe fittings in an oil field setting or in any other setting where such operations are conducted.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An apparatus for assembling and disassembling threaded pipe fittings comprising:
   (a) a base
   (b) a vice unit mounted to a stand which is mounted to the base, the vice unit arranged for securely holding a pipe fitting sub-assembly including a first pipe fitting having a threaded end and a second pipe fitting having a corresponding threaded end, the first pipe fitting securely held by the vice assembly and the second pipe fitting loosely screwed onto the first pipe fitting, the first and second pipe fittings aligned along an axis of rotation, the vice assembly further including a turntable which is mounted at least indirectly to the stand and at least a first vice and a second vice, the at least first and second vices being mounted to the turntable, the turntable being able to rotate and being able to be releasably fixed such that one vice may be placed in a position for holding a pipe fitting sub-assembly for action by the apparatus while at least a second vice is available for accepting at least a second pipe fitting sub-assembly, wherein each vice of the vice unit comprises:
   (i) a frame,
   (ii) a first vice plate assembly which is fixed to the frame, the first vice plate assembly including a first vice plate which presents a central opening suitable for receiving a pipe workpiece, the first vice plate presenting at least three radial slots, the at least three radial slots each slidably receiving a jaw member which is able to slide within each radial slot between a first outboard position and a second inboard position, each jaw member presenting a normally projecting jaw pin,
   (iii) a second vice plate assembly including a second vice plate, the second vice plate also presenting a central opening suitable for receiving a pipe workpiece, the second vice plate mechanically engaged with the first vice plate such that the second vice plate is able to rotate relative to the first vice plate about a common center, the common center being inside the central openings presented by the first and second vice plates, the second vice plate also presenting at least three jaw pin slots, wherein each jaw pin slot is suitable for slidably receiving one of the at least three jaw pins of the at least three jaw members, each jaw pin slot extending between a first location which is spaced away from the common center by a first distance and a second location which is spaced away from the common center by a second distance which is less than the first distance, the second location also being angularly spaced away from the first location when measured from the common center, and
   (iv) a mechanism for actuating the rotation of the second vice plate assembly with respect to the first vice plate assembly, such that when the mechanism rotates the second vice plate assembly from a first position to a second position, the jaw pin slots of the second vice plate assembly urge the jaw pins inboard and thereby urge the jaw members inboard such that a workpiece pipe positioned at the common center of the first and second jaw plates is able to be clamped between the jaw members as the jaw members are urged toward the inboard position,
   (c) a slidable and rotatable mandrel which presents at least one cone shaped portion for receiving a pipe section, the at least one cone shaped portion being centered on the center of the vice plate assembly such that a work piece is able to be supported by the at least one cone shaped portion of the mandrel at a location which is longitudinally spaced away from the vice plate assembly during an assembly or disassembly operation,
   (d) a leverage member secured to the second pipe fitting, the leverage member having a member extending generally normally with respect to the axis of rotation of the pipe fitting sub-assembly,
   (e) a leverage member turning unit which is mounted to the base, the leverage member turning unit including a prime mover, the leverage member turning unit having an axis of rotation and presenting an offset member which is generally parallel to and spaced away from the axis of rotation, the offset member being able to be positioned for contacting and urging the normally extending member of the leverage member for causing rotation of the second pipe fitting with respect to the first pipe fitting such that the second pipe fitting is able to be screwed onto the first pipe fitting for assembly or is able to be unscrewed from the second pipe fitting for disassembly if the pipe fitting sub-assembly is assembled and if the rotation of the second pipe fitting occurs in an opposite direction.

2. The apparatus of claim 1, wherein,
   the mechanism for actuating the rotation of the second vice plate assembly with respect to the first vice plate assembly includes:
   (a) guide pins extending normally from one of either the first or second vice plate and corresponding circumferential guide slots presented by the other of the first or second vice plate for slidably receiving the guide pins, the guide pins and guide slots suitable for guiding the rotation of the second vice plate around the common center,
   (b) an arc shaped gear rack segment fixed to the second vice plate and a driven gear suitable for engaging the rack segment mounted at least indirectly to the frame, whereby rotation of the gear causes rotation of the second vice plate about the common center.

3. An apparatus for screwing together and disassembling threaded pipe fittings comprising:
   (a) a base
   (b) a turn-table mounted to the base,
   (c) at least two vice assemblies mounted to the turn table, each vice assembly for securely holding a pipe fitting sub-assembly including a first pipe fitting having a threaded end and a second pipe fitting having a corresponding threaded end, the first pipe fitting securely held by the vice assembly and the second pipe fitting loosely screwed on to the first pipe fitting, the first and second pipe fittings aligned along an axis of rotation, (d) at least one mandrel presenting at least one cone shaped portion for receiving a pipe section, the at least one cone shaped portion being centered on the axis of rotation upon which the pipe fittings are aligned, the at least one mandrel being able to slide and rotate such that a work piece is able to be supported by the at least one cone shaped portion of one of the at least one mandrel at a location that is longitudinally spaced away from the vice assembly during an assembly or disassembly operation, (e) a leverage member that is secured to the second pipe fitting, the leverage member having a member extending generally normally with respect to the axis of rotation of the pipe fitting sub-assembly, (f) a leverage member turning unit that includes a prime mover mounted to the base, the leverage member turning unit having an axis of rotation and presenting an offset member which is generally parallel to and spaced away from the axis of rotation, the offset member being able to be positioned for contacting and urging the normally extending member of the leverage member for causing rotation of the second pipe fitting with respect to the first pipe fitting such that the second pipe fitting is screwed onto the first pipe fitting.

4. The apparatus of claim 3, wherein:

the at least one cone shaped portion of the at least one mandrel comprises at least two cone shaped portions.

* * * * *